United States Patent Office 3,549,595
Patented Dec. 22, 1970

---

3,549,595
POLY(PHENYLENESULFONATE) RESIN
AND METHOD OF PREPARATION
Robert W. Campbell, Bartlesville, Okla., assignor to Phillips Petroleum Company, a corporation of Delaware
No Drawing. Filed Mar. 11, 1969, Ser. No. 806,282
Int. Cl. C08g 23/00
U.S. Cl. 260—49                                   10 Claims

ABSTRACT OF THE DISCLOSURE

A poly(phenylenesulfonate) polymer having regular repeating units characterized by the formula:

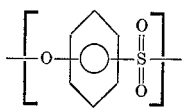

A process for the production of polymers comprising reacting a substituted or unsubstituted hydroxybenzenesulfonyl halide, a solvent selected from cyclic ketones and polar carboxylic acid amides, and a hydrogen halide acceptor. The concentration of the monomer is within the range of from 10 to 30 grams per 100 ml. of monomer plus solvent.

BACKGROUND OF INVENTION

This invention relates to new polymers and to a novel method of production of these and other polymers. In yet another aspect, this invention relates to novel poly(phenylenesulfonates) and the preparation thereof. In yet another aspect, this invention relates to unsubstituted poly(phenylenesulfonates) and to a novel method for the preparation of substituted and unsubstituted poly(phenylenesulfonates).

Polymeric aromatic sulfonates have been prepared by the reaction of a bisphenol and an aromatic disulfonyl halide according to the following reaction:

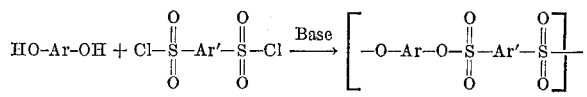

According to Hall, 3,337,512, in order to obtain high molecular weight products, it is necessary to carry out the above reaction in two phases in which the aromatic disulfonyl chloride is in an organic phase and the diphenol is dissolved in an aqueous phase with alkali. It is further necessary that equal molar amounts of the two reactants be used. Such polymers suffer numerous disadvantages; that is, they are reported to be brittle even at high molecular weights, and the materials are otherwise unsuitable for most uses.

Hall, U.S. 3,337,512, has recently disclosed a high molecular weight lineally symmetrical polymer produced by the self-condensation of an aromatic compound which contains both a phenolic group and sulfonyl chloride group as substituents on the same aryl ring. For example, a poly(2,6-xylylsulfonate) having regular phenylenesulfonate repeating units is synthesized thusly:

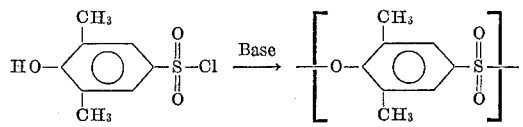

Hall found that the two isomeric 2,6-xylylsulfonyl chlorides will self-condense when dissolved in an organic solvent under anhydrous conditions in the presence of a halogen halide acceptor, to form high molecular weight essentially linear poly(2,6-xylylsulfonates).

Typical solvents disclosed by Hall in producing the above polymers include tetrahydrofuran, tetrachloroethane, and nitrobenzene. The only criteria for the selection of solvents indicated by Hall are that the solvent meet the requirements of solubility for both the starting and final product, and can be made anhydrous. Of the various solvents used by Hall, nitrobenzene was the preferred solvent.

Hall also found that the two isomeric 2,6-dichlorophenol sulfonyl chlorides self-condensed to form only low molecular weight, brittle, cyclic polymers which were completely unsatisfactory for the making of useful, shaped, polymeric products. However, Hall also found that these cyclic materials cannot be further polymerized to higher molecular weight polymers by any known means.

Insofar as I am able to ascertain, no one has ever been able to make high molecular weight products by the self-condensation of an aromatic compound, which contains both a phenolic group and a sulfonyl halide group as the only substituents on the same aryl ring. This is in part due to the fact that the necessary monomers have been unknown in the art until disclosed in the subject matter of my co-pending application Ser. No. 806,283, filed of even date herewith, and assigned to the same assignee as the present invention, and is in part due to the fact that these monomers contain no blocking groups such as the methyl groups in 2,6-xylenol-3-sulfonyl chloride, such that these monomers are highly homoreactive and a high molecular product with desired properties cannot be prepared by prior art methods.

It is, therefore, an object of my invention to prepare entirely new and novel polymeric compositions. It is also an object of my invention to produce polymers having a high molecular weight, a high melting point, better solvent resistance, and a higher degree of crystallinity resulting in better mechanical properties. It is also another object of my invention to provide a novel process for the preparation of these polymers. It is also an object of my invention to produce a novel process for the production of polymers possessing greatly improved physical properties compared to those produced by prior art processes.

SUMMARY OF INVENTION

I have now discovered poly(phenylenesulfonate) polymers having regular repeating units which can be characterized by the following formula:

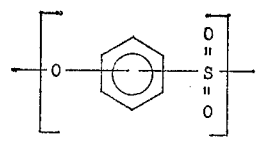

It is to be understood that in the specification and appended claims the phenylene group represented

can be any of the following:

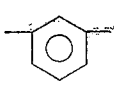  ·or 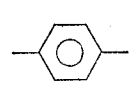

I have also discovered a new and novel process which can be employed to produce these poly(phenylenesulfonate) polymers as well as hydrocarbyl, halo, or alkoxy-substituted derivatives thereof, which can be characterized by the following repeating units:

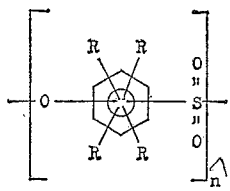

wherein $n$ is an integer in the range of from about 4 to about 10,000 or greater; and wherein R can be H, alkyl, aryl, cycloalkyl, or combinations thereof, such as aralkyl, alkaryl, and the like having in the range of about 1 to about 12 carbon atoms per R group, halogens such as chlorine, fluorine, bromine and iodine, or alkoxy having in the range of about 1 to about 6 carbon atoms per alkoxy radical.

According to the process of this invention, at least one compound represented by the formula:

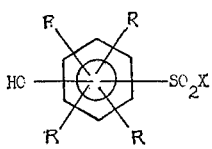

wherein R is as described above and X is a halogen comprising Cl-, Br-, or I-, is condensed in solution in a solvent selected from cyclic ketones and polar carboxylic acid amides having no hydrogen atoms bonded to nitrogen atoms, and containing a hydrogen halide acceptor.

DESCRIPTION OF PREFERRED EMBODIMENTS

Examples of hydroxybenzenesulfonyl halides that can be polymerized by the process of this invention include:

4-hydroxybenzenesulfonyl chloride
2,6-dimethyl-4-hydroxybenzenesulfonyl chloride
2-hydroxybenzenesulfonyl chloride
3-hydroxybenzenesulfonyl chloride
2,6-dichloro-4-hydroxybenzenesulfonyl iodide
3,5-dichloro-4-hydroxybenzenesulfonyl bromide
4-hydroxy-2,3,5,6-tetrafluorobenzenesulfonyl chloride
2,6-dihexyloxy-4-hydroxybenzenesulfonyl bromide
3,5-dimethoxy-4-hydroxybenzenesulfonyl chloride
2-benzyl-5-hydroxybenzenesulfonyl chloride
4-hydroxy-2,3,5,6-tetramethylbenzenesulfonyl bromide
2-dodecyl-6-hydroxybenzenesulfonyl chloride
2-cyclododecyl-6-hydroxybenzenesulfonyl chloride
3-hydroxy-5-(2-methylcyclohexyl)benzenesulfonyl chloride
3(3-cyclohexylpropyl)-5-hydroxybenzenesulfonyl chloride
4-hydroxy-2-(tolyl)benzenesulfonyl chloride
2-hydroxy-3,4,5,6-tetraethylbenzenesulfonyl iodide
4-hydroxy-2,3,5,6-tetramethoxybenzenesulfonyl bromide
and the like.

As described in copending application Ser. No. 806,283, hydroxybenzenesulfonyl halides are produced by contacting hydroxybenzenesulfonates with a halogen donor, preferably thionyl halide, phosphorus oxyhalide or carbonyl halide, in the presence of a catalytic amount of an acylated secondary amine promoter. Promoters which can be employed include one or more compounds that contain one or more acylated secondary amine moieties, e.g.,

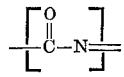

moieties, that contain in the range of 3 to 15 carbon atoms, and that optionally, in addition to such acylated secondary amine moieties, can contain in the range of 0 to 3 atoms of sulfur, oxygen, and nitrogen provided that such atoms of sulfur, oxygen, and nitrogen are not bonded to hydrogen. All of such promoters are noted to be amides, though not all amides are suitable. Some examplary classes of such promoters are represented as follows:

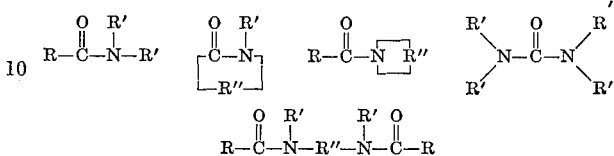

where R is H or alkyl, cycloalkyl, aryl, or combinations thereof containing in the range of 1 to 10 carbon atoms; where R' is alkyl, cycloalkyl, aryl or combinations thereof having in the range of 1 to 10 carbon atoms; and R" is a divalent organic radical containing in the range of 3 to 10 carbon atoms and from 0 to 3 atoms selected from sulfur, oxygen, and nitrogen, provided that such atoms of sulfur, oxygen, or nitrogen are not bonded to hydrogen. Some examples of these promoters include N-methylpyrrolidone, N-acetylpyrrolidine, tetramethylurea, dimethylformamide, tetrapropylurea, N,N-dibutylbenzenecarboxamide, N-cyclohexyl - N - methyl-(2 - methylbenzene)carboxamide, N,N - dibenzylformamide, N-acetylmorpholine, N,N'-diacetylpiperazine, N-butylpyrrolidone, N,N'-diacetyl-N,N'-dimethylhexanediamine, and the like.

The concentration of the promoters employed in these conversions should not exceed about 10 parts per 100 parts by weight of the hydroxybenzenesulfonate. Preferably, the promoter concentration should not exceed about 5 parts per 100 of hydroxybenzenesulfonate. More preferably, promoter concentrations of from about 1 to about 5 parts per 100 parts are employed in most applications. Of course, the optimum concentration of the particular promoter employed with the particular hydroxybenzenesulfonate, under the desired reaction conditions can be readily determined by one skilled in the art.

Temperatures within the range of from about 0 to about 100° C. are usually employed in this reaction although higher and lower temperatures can be employed, more preferably temperatures within the range of from about 50 to about 70° C. are employed. For example, a 4-hydroxybenzenesulfonate and a halogen donor (e.g., a thionyl halide, a carbonyl halide, a phosphorus oxyhalide) are charged to the reactor concurrently with the acylated secondary amine promoter. Mole ratios of 4-hydroxybenzenesulfonate to halogen donor are generally in the range of 1:0.5 to 1:50, and are preferably in the range of 1:2 to 1:10. As stated above, the acylated secondary amine promoters should not be present in amounts greater than about 10 parts promoter per 100 parts 4-hydroxybenzenesulfonate.

The hydroxybenzenesulfonyl halide products so produced can be recovered by employing a recrystallization process which is disclosed in copending application Ser. No. 806,280. This process comprises dissolving a crude hydroxybenzenesulfonate halide product in a solvent such as benzene at a convenient temperature, e.g., room temperature, cooling to solidify the solution, and then adding a second solvent such as hexane that is substantially a non-solvent for the hydroxybenzenesulfonyl halide, but which is miscible with solvent employed previously. The second solvent in the frozen mixture is allowed to equilibrate resulting in the separation of crystalline hydroxybenzenesulfonyl halide. Crystalline material of high purity has been obtained as in the above process, even when starting with crude oily materials.

The polar carboxylic acid amides useful as solvents in the instant invention comprise N-methylpyrrolidone, dimethylacetamide, dimethylformamide, and the like, and mixtures thereof. The cyclic ketones useful in the process of the instant invention include cyclohexanone, cyclododecanone, and the like, and mixtures thereof. In a preferred embodiment of the instant invention, the solvent comprises a mixture of N-methylpyrrolidone and dimethylacetamide wherein the ratio of N-methylpyrrolidone to dimethylacetamide is about 60:40 by volume.

According to the process of this invention, relatively low temperatures in the range of from about 0° C. to about −70° C. are employed; more preferably, temperatures in the range of from about −30° C. to about 40° C. are employed.

Furthermore, the monomer must be present in the solution in the range of from about 10 to about 30 grams per 100 ml. of solution, and, more preferably, from about 15 to about 25 grams per 100 ml. of solution of monomer and solvent.

An anhydrous solution of monomer and solvent is admixed with a hydrogen halide acceptor at the temperature above specified to effect condensation. In the presence of the hydrogen halide acceptor, the sulfonyl halide group of one molecule readily reacts with the hydroxyl group of another molecule to produce, for example, an essentially linear poly(phenylenesulfonate) according to the following equation wherein the sulfur atom on one benzene ring is joined to the oxygen atom on the adjacent benzene ring of the polymer molecule as for example:

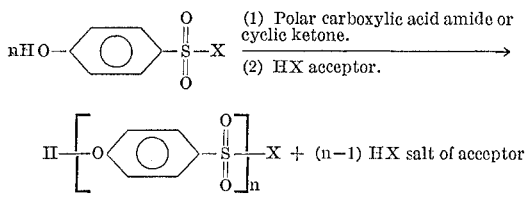

In the above equation, $n$ represents the number of molecules of parahydroxybenzenesulfonyl halide which condense to form one molecule of the polymer. The actual number of molecules of the monomer which react to form a polymer is not constant for all polymer molecules, but is a distribution. Since my polymers have film and fiber-forming properties, they have an average molecular weight of at least about 10,000 and generally higher, which would mean that $n$ is an average of at least about 65, and generally is 100 or higher. Generally my polymers have an inherent viscosity in LiCl-N-methylpyrrolidone (4 weight percent of mixture comprised of LiCl) at 30° C. of 0.2 or greater, preferably in the range of 0.2–0.7 or greater.

Examples of hydrogen halide acceptors which one may use include alkaline earth metal hydroxides and tertiary amines. Examples of suitable alkaline earth metal hydroxides include the beryllium hydroxide, magnesium hydroxide, calcium hydroxide, strontium hydroxide, and barium hydroxide. Examples of suitable tertiary amines include triethylamine, trimethylamine, tetramethylethylenediamine, N-methylpiperidine, ethyldiisopropylamine, triethylenediamine, 2,4,6 - collidine, (dimethylamino) methylbenzene, and N,N′-dimethylpiperazine, hexamethylenetetraamine, and the like. In effect, any tertiary amine, that is, a compound wherein the three valences of the nitrogen are bonded to carbon atoms, that does not contain labile hydrogen groups and that does not deleteriously react under the reaction environment, can be employed.

Sufficient time to effect the degree of conversion desired should be employed, generally reaction times in the range of about 1 minute to about 3 hours are employed; more preferably, about 1 minute to about 30 minutes, and still more preferably, from about 10 minutes to about 20 minutes.

Pressure sufficient to maintain the reactants substantially completely in the liquid phase should be employed, generally pressures in the range of about 0.5 to about 10 atmospheres are suitable.

If desired, the conversion can be run continuously as well as batchwise. Polymer can be recovered by conventional means such as filtration, centrifuging, solvent stripping, and the like. Conventional reaction techniques and conventional equipment can be employed.

The value and operability of the process of this invention are demonstrated by the following examples:

Example I

A stirred reactor maintained under $N_2$ was charged with 1.93 g. (10 millimoles) of 4-hydroxybenzenesulfonyl chloride, 8 ml. of N-methylpyrrolidone, and 6 ml. of dimethylacetamide. After bringing the reactor contents to −37° C., 1.52 g. of triethylamine was added. The reaction was effected for 10 minutes at −37° C., then 200 ml. of $H_2O$ was added. A white polymer was recovered which was washed with water, methanol, water, methanol, and repeatedly with hot (50° C.) acetone. A total of 1.1 g. of polymer having an inherent viscosity in LiCl-N-methylpyrrolidone at 30° C. (4 weight percent of mixture comprised of LiCl) of 0.56 (inherent viscosity is proportional to molecular weight) was recovered after drying in vacuo at 70° C. which constituted a yield of 71 mole percent based on the 4-hydroxybenzenesulfonyl chloride charged.

This example demonstrates the preparation of polyphenylenesulfonate according to the process of this invention. The good yield of high molecular weight polymer which is not soluble in hot acetone is particularly noteworthy.

Example II

A stirred reactor maintained under $N_2$ was charged with 1.93 g. of 4-hydroxybenzenesulfonyl chloride, 4 ml. of dimethylacetamide, and 6 ml. of N-methylpyrrolidone. Upon cooling of the reactor contents to −35° C., 1.5 g. of triethylamine was added. The reaction was continued for 10 minutes at −35° C. and 200 ml. of $H_2O$ was then added. The polymer was recovered by filtration, was washed with water, methanol, water, methanol, and repeatedly with hot acetone (50° C.). The washed polymer was dried at 70° C. for 16 hours; it then weighed 1.05 g. Inherent viscosity in LiCl-N-methylpyrrolidone (as in Example I, 30° C.) was 0.60. Yield of purified poly(phenylenesulfonate) polymer, which was not soluble in hot (50° C.) acetone was 67 mole percent based on the 4-hydroxybenzenesulfonyl chloride charged.

Example III

A stirred reactor maintained under $N_2$ was charged with 1.93 g. of 4-hydroxybenzenesulfonyl chloride, 8 ml. of N-methylpyrrolidone, and 7 ml. of dimethylacetamide. Upon lowering the temperature to −37° C., 1.94 g. of ethyldiisopropylamine was added. After 10 minutes reaction at −37° C., 200 ml. of $H_2O$ was added and the polymer was filtered from the mixture. The polymer was washed as in Example I and dried in vacuo at 70° C. for 16 hours to yield 1.1 g. of dried polymer, a 71 mole percent yield based on 4-hydroxybenzenesulfonyl chloride charged. Inherent viscosity determined as in Example I (30° C.) was 0.45.

Example IV

Another run was effected wherein calcium hydroxide was employed as the base and a 5-minute reaction time was employed, but otherwise substantially the same as Example III. A total of 0.85 gram of polymer was recovered, a 55 mole percent yield based on 4-hydroxybenzenesulfonyl chloride charged. Inherent viscosity determined as in Example I (30° C.) was 0.24.

Example V

A stirred reactor maintained under $N_2$ was charged with 1.93 g. of 4-hydroxybenzenesulfonyl chloride and 14 ml. of dimethylformamide. Upon cooling to −52° C., 1.52 g. (15 millimoles) of triethylamine was quickly added. After 20 minutes reaction at −52° C., 200 ml. of water was added and the polymer was filtered from the mixture. The polymer was washed and dried as in Example I. A polymer having an inherent viscosity of 0.41 (as in Example I) was recovered.

Example VI

A sample of the polyphenylenesulfonate prepared in Example II was molded at 280° C., 1500 p.s.i.g. for 30 seconds and quenched in cold water. Film thickness was 7 mils. A sample of this film was tested and found to have a tensile strength of 6885 p.s.i.g. with an elongation of 2 percent. A sample of this film was drawn to about two times its original length at 135° C. Both films were tough and clear.

Another sample of polyphenylenesulfonate prepared according to the process of this invention was melted, and fibers were pulled from the melt. Such fibers were then hand-drawn by heating briefly at 140° C. The fibers were strong and clear.

Example VII

A stirred reactor maintained under $N_2$ was charged with 2.21 g. (10 millimoles) of 4-hydroxy-3,5-dimethylbenzenesulfonyl chloride and 14 ml. of N-methylpyrrolidone. Upon lowering the temperature to −25° C., 1.52 grams (15 millimoles) of triethylamine was added. After 6 minutes reaction at −25° C., 200 ml. of water was added at about 25° C. and the polymer filtered from the mixture. The polymer was washed as in Example I and dried in vacuo at 70° C. for 16 hours to yield 0.5 g. of polymer having an inherent viscosity of 0.38 in LiCl-N-methylpyrrolidone (as in Example I) and having an inherent viscosity in nitrobenzene of 0.23 (at 30° C.). Melting point was 230–245° C. The acetone filtrate was evaporated yielding an additional 1.0 gram of white polymer.

This example demonstrates that the process of the instant invention produces unexpectedly high yields of unexpectedly high quality polymers of prior art materials.

Example VIII

A solution comprised of 1.93 g. (10 millimoles) of 4-hydroxybenzenesulfonyl chloride and 20 ml. of methylene chloride was quickly added to a rapidly stirred solution comprised of 0.41 g. (10 millimoles) of NaOH and two drops of a 60% aqueous benzenyltrimethylammonium chloride in 20 milliliters of water. The mixture was stirred rapidly for two hours at room temperature, and then poured into 100 ml. of 2-propanol. No polymer was determined to be formed.

A second run wherein 4.81 (25 millimoles) of 4-hydroxybenzenesulfonyl chloride dissolved in 90 ml. of methylene chloride was rapidly added to a stirred solution comprised of 2.76 g. (26 millimoles) of sodium carbonate in 100 ml. of water at room temperature. After stirring for three hours at room temperature, the reaction mixture was poured into 8 ml. of 2-propanol. Again, no polymer was formed. The runs of this example demonstrate that prior art methods of interfacial polymerization are not effective to polymerize the 4-hydroxybenzenesulfonyl chloride.

Example IX

A stirred reactor maintained under nitrogen was charged with 9.63 g. (50 millimoles) of 4-hydroxybenzenesulfonyl chloride and 20 ml. of nitrobenzene. At room temperature, a mixture comprised of 7.85 g. (70 millimoles) of triethylenediamine and 20 ml. of nitrobenzene was added over a period of 15 minutes. The mixture was stirred at room temperature for an additional 15 hours. The reactor contents were then poured into 200 ml. of ether. A precipitate was recovered by filtration and was washed repeatedly with ether. The precipitate was washed with water two times and dried in vacuo. The precipitate was then washed with acetone and dried in vacuo at 50° C. 5.1 grams of a white powdery solid was obtained having a melting point of approximately 250° C. and having an inherent viscosity in N-methylpyrrolidone of 0.06 (30° C.). Yield based on the 4-hydroxybenzenesulfonyl chloride charged was about 67 mole percent.

This run wherein the process of U.S. 3,337,512 was employed in an attempt to make a useful polymer from 4-hydroxybenzenesulfonyl chloride demonstrates that this prior art method will not produce polymers from which film or fiber can be produced. Low inherent viscosity as noted above indicates that what polymer was produced is of such low molecular weight as to be of very little value for many purposes.

Example X

A stirred reactor maintained under nitrogen was charged with 3,5-dimethyl-4-hydroxybenzenesulfonyl chloride and nitrobenzene under a nitrogen atmosphere. Triethylenediamine was then added and the reaction was otherwise carried out as described in Example III of U.S. 3,337,512. A yield comparable to that of U.S. 3,337,512 of the crude reaction product was obtained. However, after extraction with acetone, only a 38 percent yield of acetone insoluble polymer was recovered upon drying in vacuum.

This example demonstrates the preparation of the poly(2,6-xylyl-4-sulfonate) polymer of U.S. 3,337,512 according to the process of that patent.

Example XI

Runs were made wherein a polyphenylenesulfonate polymer previously prepared according to the process of the instant invention (the polymer of Example I) and a prior art polymer, the polymer of U.S. 3,337,512, previously prepared according to the process of that invention (the polymer of Example X) were comparatively tested for thermal stability.

Upon heating the polymer of the instant invention, the polymer of Example I, to 280° C., the melting temperature, the polymer showed no weight loss for approximately 40 minutes after the run had begun. Only 5% of the weight was lost after 1 hour at that temperature.

The poly(2,6 - xylyl - 4 - sulfonate) polymer of U.S. 3,337,512, of Example X, when heated to 280° C. began to lose weight immediately. After only 30 minutes at 280° C., that prior art polymer had lost 20% of its weight.

The above comparative runs clearly demonstrate that the polyphenylenesulfonyl compositions of the instant invention exhibit outstanding resistance to heat degradation in comparison to prior art polymers.

The new polymers of this invention have a wide variety of uses; as coating compositions they may be coated onto metallic or nonmetallic substrates, by flame spraying, melt casting, or by casting while dissolved in one of the solvents in which it is made, or other solvent in which it is soluble, and thereafter evaporating the solvent at an elevated temperature, and if desired, at reduced pressure. The hot solution of the solvent may be forced through a spinneret into a heated drying tower, preferably maintained at a reduced pressure, to form filaments or fibers, or the molten polymer may be forced through spinnerets by well-known techniques to form filaments and fibers. The fibers so formed may be formed into yarns or used to form fiber matting. Alternatively, the polymers may be cast from solution or from the melt of the polymer, extruded through a die or otherwise sheeted to form a continuous film of the polymers. The compositions may also be injection molded to form intricately shaped objects of wide utility, dependent on the particular object molded.

Other uses for these films and fabric or mats made from the fibers include a wide variety of electrical applications, that is, as a dielectric, for example, as a dielectric in capacitors, as slot insulation for motors, primary insulation for heat-resistant wire, pressure-sensitive electrical tape, split mica insulating tape, i.e., mica sheet laminated or bonded with the polymer, small condensers, metal foil laminated to the film or film having an adherent metal coating, weather resistant electrical wire, i.e., a conductor wrapped with film coated with asphalt, as a wrapping for submerged pipe to insulate against ground current as primary and secondary insulation in transformer construction, as a dielectric in electroluminescent structures, etc.

Other valuable uses for the polymers of this invention will be readily apparent to those skilled in the art. Also, many apparently widely different embodiments such as the adding of pigments, fillers, stabilizers, plasticizers, etc., may be made to modify the properties of the polymers without departing from the spirit and scope of the invention. It is therefore to be understood that changes may be made in the particular embodiments of the invention described which are within the full intended scope of the invention as defined by the appended claims.

I claim:
1. A poly(phenylenesulfonate) polymer having an inherent viscosity of at least 0.2 as determined in lithium chloride-N-methylpyrrolidone (4 weight percent of mixture comprised of lithium chloride) at 30° C. and consisting essentially of repeating units of the structure:

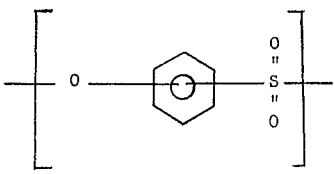

2. A poly(phenylenesulfonate) polymer according to claim 1 consisting essentially of repeating units of the structure:

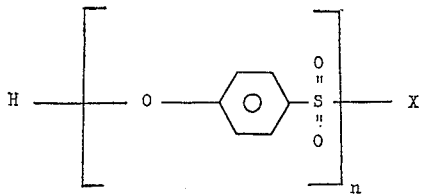

wherein X is Cl, Br, or I; and $n$ is at least 65 and the inherent viscosity is in the rang of 0.2–0.7.

3. A process for the production of polymers consisting essentially of repeating units of the structure:

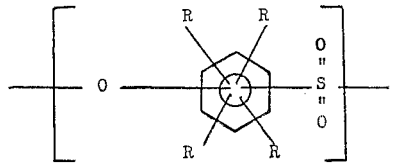

wherein each R is the same or different and is selected from the group consisting of H, alkyl, aryl, cycloalkyl, alkylcycloalkyl, cycloalkylalkyl, aralkyl, alkaryl having from about 1 to about 12 carbon atoms per R group, halogens and alkoxy having from 1 to 6 carbon atoms per alkoxy radical comprising reacting a solution containing at least one monomer represented by

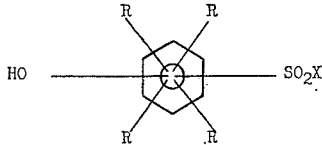

wherein X is a halogen comprising Cl, Br, or I and R is as described above in a solvent selected from cyclic ketones selected from the group consisting of cyclohexanone and cyclododecanone and polar carboxylic acid amide having no hydrogen atoms bonded to nitrogen atoms at a temperature of from about 0° C. to about −70° C. containing a hydrogen halide acceptor, the concentration of said monomer being from about 10 to about 30 grams per 100 milliliters of monomer plus solvent.

4. A process according to claim 2 wherein said hydrogen halide acceptor is selected from the group consisting of tertiary amines and alkaline earth metal hydroxides.

5. A process according to claim 4 wherein said tertiary amine is triethylamine, trimethylamine, tetramethylethylenediamine, N-methylpiperidine, ethyldiisopropylamine, triethylenediamine, 2,4,6 - collidine, (dimethylamino)methylbenzene, N,N′-dimethylpiperazine, or hexamethylenetetraamine.

6. A process according to claim 4 wherein said alkaline earth hydroxide is beryllium, magnesium, calcium, strontium, or barium hydroxide.

7. A process according to claim 4 wherein said amide solvent is N-methylpyrrolidone, dimethylacetamide, or dimethylformamide.

8. A process according to claim 7 wherein said amide solvent consists of about 60 volume percent of N-methylpyrrolidone and about 40 volume percent of dimethylacetamide.

9. A process according to claim 4 wherein the time of said contacting is from 1 minute to about 3 hours.

10. A process according to claim 3 wherein said contacting is accomplished at a pressure of from about 0.5 to about 10 atmospheres.

References Cited

UNITED STATES PATENTS 3,337,512   8/1967   Hall _____ 260—79.3
3,401,148   9/1968   Schlott et al. _____ 260—49

WILLIAM H. SHORT, Primary Examiner

L. L. LEE, Assistant Examiner

U.S. Cl. X.R.

117—75, 122, 123, 128.4, 132, 161, 232; 161—206, 213; 260—30.2, 32.4, 32.8, 33.6; 264—176, 204; 317—242